(12) United States Patent
Kim et al.

(10) Patent No.: US 10,295,869 B2
(45) Date of Patent: May 21, 2019

(54) DISPLAY DEVICE

(71) Applicant: Samsung Display Co., Ltd, Yongin-si, Gyeonggi-do (KR)

(72) Inventors: Hyun Kim, Suwon-si (KR); Seul Ki Kim, Incheon (KR); Seung Ha Choi, Hwaseong-si (KR); Yun Seok Han, Cheonan-si (KR); Kap Soo Yoon, Seoul (KR); Jeong Uk Heo, Asan-si (KR)

(73) Assignee: Samsung Display Co., Ltd. (KR)

( * ) Notice: Subject to any disclaimer, the term of this patent is extended or adjusted under 35 U.S.C. 154(b) by 222 days.

(21) Appl. No.: 15/257,293

(22) Filed: Sep. 6, 2016

(65) Prior Publication Data

US 2017/0102574 A1  Apr. 13, 2017

(30) Foreign Application Priority Data

Oct. 12, 2015  (KR) .......................... 10-2015-0141961

(51) Int. Cl.
*G02F 1/1339* (2006.01)
*G02F 1/1333* (2006.01)
*G02F 1/1335* (2006.01)
*G02F 1/1368* (2006.01)
*G02F 1/1337* (2006.01)
G02F 1/1343 (2006.01)

(52) U.S. Cl.
CPC ........ *G02F 1/13394* (2013.01); *G02F 1/1337* (2013.01); *G02F 1/1368* (2013.01); *G02F 1/133345* (2013.01); *G02F 1/133512* (2013.01); *G02F 1/133514* (2013.01); *G02F 1/134363* (2013.01); *G02F 2001/13396* (2013.01); *G02F 2001/13398* (2013.01); *G02F 2202/02* (2013.01)

(58) Field of Classification Search
CPC ........... G02F 1/13394; G02F 1/133377; G02F 1/133345; G02F 1/133512; G02F 1/133514; G02F 1/1368; G02F 1/1337; G02F 1/134363; G02F 2001/133377; G02F 2001/13396; G02F 2001/13398; G02F 2202/02
USPC ........................................................ 349/156
See application file for complete search history.

(56) References Cited

U.S. PATENT DOCUMENTS

2017/0059906 A1* 3/2017 Cho ...................... G02F 1/1339

FOREIGN PATENT DOCUMENTS

KR  10-2013-0015245 A  2/2013

* cited by examiner

*Primary Examiner* — Nathanael R Briggs
*Assistant Examiner* — William D Peterson
(74) *Attorney, Agent, or Firm* — Innovation Counsel LLP

(57) ABSTRACT

A display device is provided. The display device includes: a first substrate that comprises a first base substrate, an insulating layer located on the first base substrate, and a barrier layer located on the insulating layer; a second substrate that faces the first substrate; a liquid crystal layer that is located between the first substrate and the second substrate; and a first spacer that is located between the first substrate and the second substrate and is in contact with the first substrate, wherein the first substrate further comprises a second spacer that is located on the barrier layer and overlaps with the first spacer.

25 Claims, 9 Drawing Sheets

DISPLAY DEVICE

This application claims priority from Korean Patent Application No. 10-2015-0141961 filed on Oct. 12, 2015 in the Korean Intellectual Property Office, the disclosure of which is incorporated herein by reference in its entirety.

BACKGROUND

1. Field of the Inventive Concept

The present invention relates to a display device.

2. Description of the Related Art

In general, a liquid crystal display device may include two substrates facing each other, and a liquid crystal layer interposed between the two substrates. Since the thickness of the liquid crystal layer may affect the light transmission passing through the liquid crystal layer, a spacer is disposed between both substrates to uniformly keep a gap between both substrates.

When an external force is applied to the liquid crystal display device, the spacer may be deformed by the external force, changing the distance between the two substrates. This change in the spacing in turn affects the light transmittance of the liquid crystal layer. Moreover, depending on how the external force is applied, the spacer may move in a lateral direction, possibly causing damage to one or both substrates.

SUMMARY

The present disclosure provides a display device that is capable of uniformly keeping a gap between both substrates and has improved reliability.

The present inventive concepts are not limited to the technical problem mentioned above, and other aspects that have not been mentioned will be clearly understood by those skilled in the art from the following description.

According to an aspect of the present inventive concept, there is provided a display device. The display device includes: a first substrate that comprises a first base substrate, an insulating layer located on the first base substrate, and a barrier layer located on the insulating layer; a second substrate that faces the first substrate; a liquid crystal layer that is located between the first substrate and the second substrate; and a first spacer that is located between the first substrate and the second substrate and is in contact with the first substrate, wherein the first substrate further comprises a second spacer that is located on the barrier layer and overlaps with the first spacer.

According to another aspect of the present inventive concept, there is provided a display device. The display device includes: a first substrate; a second substrate that faces the first substrate; a liquid crystal layer that is located between the first substrate and the second substrate; and a first spacer that is located between the first substrate and the second substrate and is in contact with the first substrate, wherein the first substrate comprises: a first base substrate; a thin film transistor located on the first base substrate; an insulating layer disposed on the thin film transistor; a first electrode located on the insulating layer; a second spacer that is located on the first electrode and overlaps with the first spacer; a passivation layer located on the first electrode and the second spacer; and a second electrode located on the passivation layer and connected to the thin film transistor.

According to still another aspect of the present inventive concept, there is provided a display device. The display device includes: a first substrate; a second substrate that faces the first substrate; a liquid crystal layer that is located between the first substrate and the second substrate; and a first spacer that is located between the first substrate and the second substrate and is in contact with the first substrate, wherein the first substrate comprises: a first base substrate; a thin film transistor located on the first base substrate; an insulating layer disposed on the thin film transistor; a barrier layer located on the insulating layer; a second spacer that is located on the barrier layer and overlaps with the first spacer; a first electrode located on the barrier layer and the second spacer; and a second electrode that is located on the passivation layer and is connected with the thin film transistor.

Specific matters of other aspects are included in the detailed description and drawings.

According to the aspects of the present invention, it is possible to provide a display device which has improved reliability and is capable of uniformly keeping a gap between the first substrate and the second substrate.

Effects of the present invention are not limited by those illustrated above, and further various effects are included herein.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
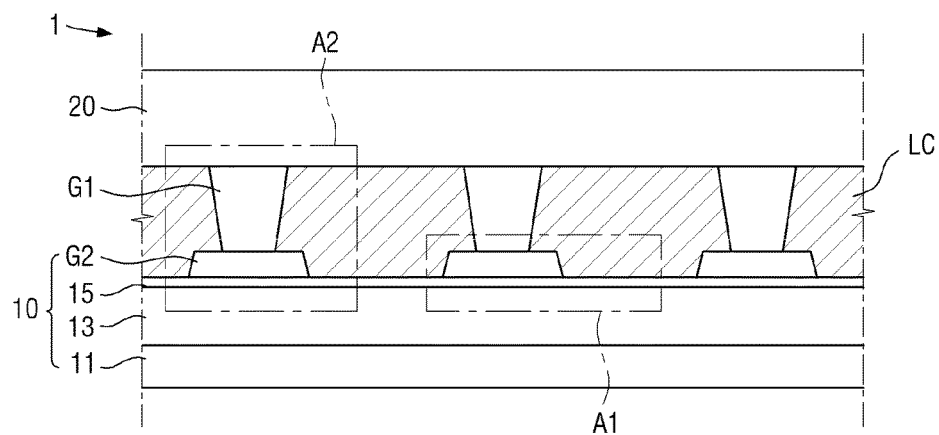
FIG. 1 is a cross-sectional view illustrating a schematic laminated structure of a display device according to an exemplary embodiment of the present invention.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which the present application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The same or similar parts throughout the specification are denoted by the same reference numerals.

Hereinafter, embodiments of the present inventive concept will be described referring to the drawings.

Figure 2:
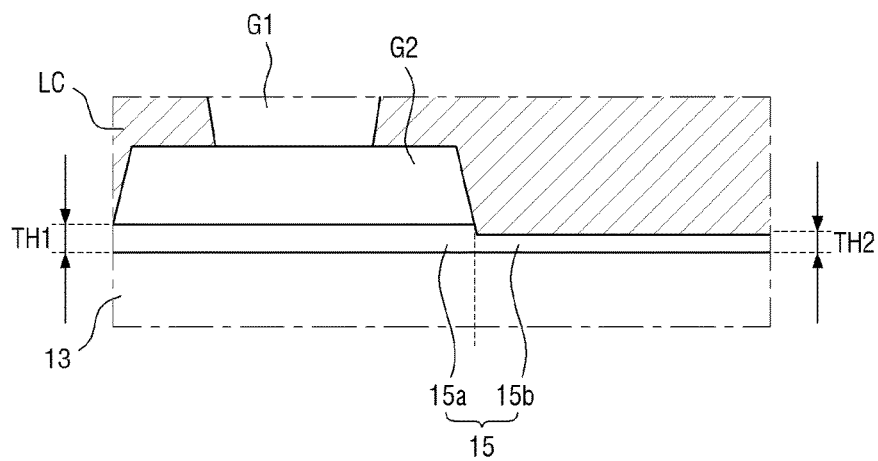
FIG. 2 is an enlarged cross-sectional view of a part A1 of FIG. 1.
Figure 3:
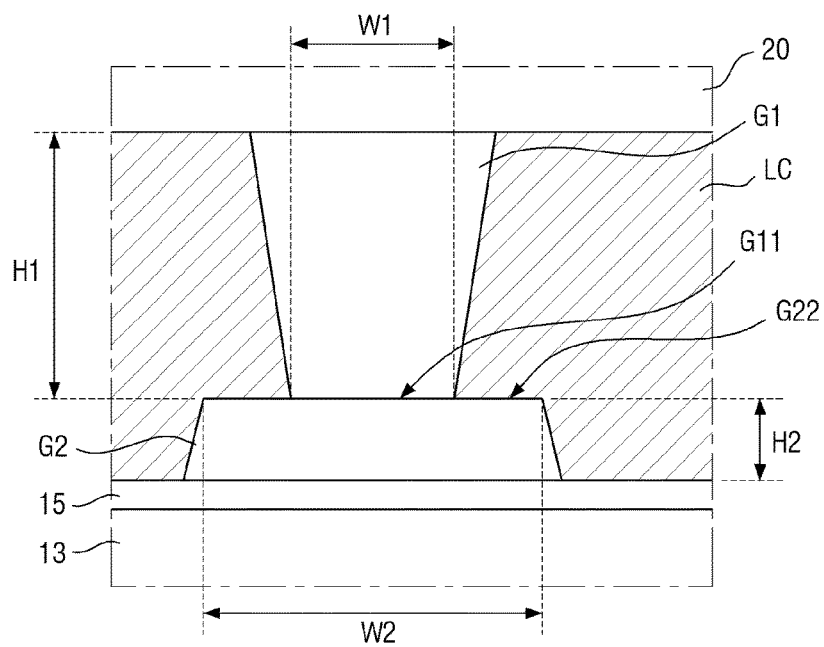
FIG. 3 is an enlarged cross-sectional view of a part A2 of FIG. 1.

FIG. 1 is a cross-sectional view illustrating a schematic lamination structure of a display device according to an exemplary embodiment of the present invention, FIG. 2 is an enlarged cross-sectional view of a part A1 of FIG. 1, and FIG. 3 is an enlarged cross-sectional view of a part A2 of FIG. 1.

Referring to FIGS. 1 to 3, a display device 1 according to this embodiment may include a first substrate 10, a second substrate 20, a liquid crystal layer LC and a first spacer G1.

The first substrate 10 may include a first base substrate 11, an insulating layer 13 located on the first base substrate 11, a barrier layer 15 located on the insulating layer 13, and a second spacer G2a that is located on the barrier layer 15 and protrudes toward the second substrate 20. Also, although it is not illustrated in the drawings, the first substrate 10 may further include a data line, a gate line, a thin film transistor, a pixel electrode and the like that are located on the first base substrate 11.

The first base substrate 11 may be an insulating substrate. For example, the first base substrate 11 may be formed of a glass substrate, a quartz substrate, a transparent resin substrate or the like. The first base substrate 11 may also include a polymer or plastic having high heat resistance.

In some embodiments, the first base substrate 11 may also have flexibility. That is, the first substrate 100 may be a substrate that can be modified in a form, by rolling, folding, bending or the like.

The insulating layer 13 may be located on the first base substrate 11 and may cover the thin film transistor or the like located on the first base substrate 11. In some embodiments, the insulating layer 13 may include an organic insulating material. Moreover, in some embodiments, the insulating layer 13 may also include a color pigment. That is, the insulating layer 13 may also be a color filter.

The barrier layer 15 may be located on the insulating layer 13 and may prevent the insulating layer 13 from being damaged or etched in the process of forming the second spacer G2.

The second spacer G2 may be located on the barrier layer 15 and may protrude toward the second substrate 20. In some embodiments, the second spacer G2 may be formed of a material with an etch rate higher than the barrier layer 15. For example, if that the material contained in the second spacer G2 has an etch rate that is more than twice that of the material contained in the barrier layer 15, this means that the etch rate of the material contained in the second spacer G2 is at least twice as high as the etch rate of the material contained in the barrier layer 15 when performing an etching process (e.g., a wet etching process, a dry etching process or the like). The etch rate of the second spacer G2 may be greater than several ten to hundred times the etch rate of the barrier layer 15. That is, the etch rate of the material contained in the second spacer G2 may be faster than the etch rate of the material contained in the barrier layer 15 by several ten to hundred times in the same etching process. In other words, the etch rate of the material contained in the barrier layer 15 may be considerably slower than the etch rate of the material contained in the second spacer G2 in the same etching process. Accordingly, the barrier layer 15 may prevent the insulating layer 13 from being damaged or etched in the process of forming the second spacer G2.

The barrier layer 15 may include a first portion 15a overlapping with the second spacer G2, and a second portion 15b different from the first portion 15a. Further, in some embodiments, a thickness TH1 of the first portion 15a may be larger than a thickness TH2 of the second portion 15b. When a process such as ashing (e.g., oxygen plasma ashing or the like) is performed in the formation process of the second spacer G2, the first portion 15a of the barrier layer 15 is covered with the second spacer G2, but the second portion 15b may not be covered with the second spacer G2. Thus, in the case of the second portion 15b, it may be exposed to oxygen plasma or the like when performing the ashing process, and finally, the thickness TH2 of the second portion 15b may become smaller than the thickness TH1 of the first portion 15a.

In some embodiments, the second spacer G2 may include an insulating material, and the insulating material may be an organic insulating material. As an example, the second spacer G2 may be made of a photosensitive organic insulating material. Otherwise, in another embodiment, the second spacer G2 may contain a metal. The metal may be a low-resistance metal, and as an example, the metal may be, but is not limited to, an aluminum-based metal such as aluminum (Al) or an aluminum alloy, a silver-based metal such as silver (Ag) or silver alloy, a copper-based metal such as copper (Cu) or a copper alloy, a molybdenum-based metal such as molybdenum (Mo) or a molybdenum alloy, chromium (Cr), tantalum (Ta), and titanium (Ti).

In some embodiments, the barrier layer 15 may contain an inorganic insulating material. As an example, the barrier layer 15 may include at least one of silicon oxide silicon oxyntride and silicon nitride. Otherwise, in another embodiment, the barrier layer 15 may include a transparent conductive material. For example, the barrier layer 15 may be formed of a transparent conductive material such as ITO, IZO, ITZO and AZO.

As the barrier layer 15 is located between the insulating layer 13 and the second spacer G2, the thickness of the insulating layer 13 and the thickness of the second spacer G2 may be easily formed at a desired level. That is, after the thickness of the insulating layer 13 is formed at a desired level, the barrier layer 15 is formed, and then, the second spacer G2 is formed. That is, the forming process of the insulating layer 13 and the forming process of the second spacer G2 are performed independently of each other, and are not affected by each other. Thus, even when a patterning process or the like is performed during formation of the second spacer G2, the insulating layer 13 is protected by the barrier layer 15, damage or the like may not occur in the insulating layer 13, and the thickness of the insulating layer 13 may be maintained at a desired level. In addition, the thickness of the second spacer G2 is also adjustable independently of the thickness of the insulating layer 13, and the thickness of the second spacer G2 may be easily formed at a desired level.

The second substrate 20 may be located on the first substrate 10 to face the first substrate 10.

A liquid crystal layer LC may be interposed between the first substrate 10 and the second substrate 20. The liquid crystal layer LC may include liquid crystal molecules (not illustrated) having dielectric anisotropy. As an example, a major axis of the liquid crystal molecules may be oriented parallel to the first substrate 10 or the second substrate 20 in the absence of an electric field, and in this case, the liquid crystal molecules may have a positive dielectric anisotropy. Otherwise, the liquid crystal molecules may be nematic liquid crystal molecules having a structure in which its major axis direction is twisted from the first substrate 10 to the second substrate 20. Otherwise, the major axis of the liquid crystal molecules may be oriented generally perpendicularly to the first substrate 10 or the second substrate 20 in the absence of an electric field, and in such a case, the liquid crystal molecules may have a negative dielectric anisotropy.

The first spacer G1 may be located between the first substrate 10 and the second substrate 20, and the first spacer G1 may be located above the second spacer G2.

In some embodiments, the first spacer G1 may be made of an organic insulating material, and the organic insulating material may have photosensitivity. The first spacer G1 may be formed by forming a photosensitive organic insulating material layer on the second substrate 20 and by patterning the photosensitive organic insulating material layer through a photolithography process or a photoengraving process.

The first spacer G1 and the second spacer G2 may overlap with each other. The first spacer G1 and the second spacer G2 may maintain a gap between the first substrate 10 and the second substrate 20 at a desired level. This makes it possible to maintain the thickness of the liquid crystal layer LC at a desired level. The thickness of the liquid crystal layer LC may affect the light transmittance. Therefore, the uniform maintenance of the thickness of the liquid crystal layer LC at a desired level may be an important factor in maintaining the display quality. The first spacer G1 and the second spacer G2 may maintain a gap between the first substrate 10 and the second substrate 20 at a desired level as described above, thereby consequently contributing to the uniform maintenance of the thickness of the liquid crystal layer LC at the desired level.

Meanwhile, since the barrier layer 15 is located between the insulating layer 13 and the second spacer G2, the thickness of the insulating layer 13 and the thickness of the second spacer G2 may also be maintained at desired levels. This may contribute to the maintenance of the gap between the first substrate 10 and the second substrate 20 at a desired level, and consequently, it is possible to prevent the deterioration of the display quality.

In some embodiments, the first spacer G1 and the second spacer G2 may be in direct contact with each other. For example, an end portion (G11, hereinafter, "an end portion of the first spacer") of the first spacer G1 facing the first substrate 10 may be in direct contact with an end portion (G22, hereinafter, "an end portion of the second spacer") of the second spacer G2 facing the second substrate 20. In another embodiment, another layer such as an organic layer may be located between the end portion G11 of the first spacer and the end portion G22 of the second spacer, and in such a case, the end portion G11 of the first spacer and the end portion G22 of the second spacer may not be in direct contact with each other.

A width W1 of the end portion G11 of the first spacer and a width W2 of the end portion G22 of the second spacer may be different from each other. In some embodiments, the width W1 of the end portion G11 of the first spacer may be smaller than the width W2 of the end portion G22 of the second spacer. As used herein, "width" is measured on a plane that is parallel to an interface between the first spacer G1 and the second substrate 20. An "end portion" of the first spacer G1 is the portion that is farthest from the second substrate 20. An "end portion" of the second spacer G2 is the portion that is farthest from the first base substrate 11.

The thickness H1 of the first spacer G1 and thickness H2 of the second spacer G2 may be different from each other. In some embodiments, the thickness H1 of the first spacer G1 may be larger than the thickness H2 of the second spacer G2. A "thickness" of the first spacer is measured in a direction orthogonal to the interface between the first spacer G1 and the second substrate 20.

Figure 4:
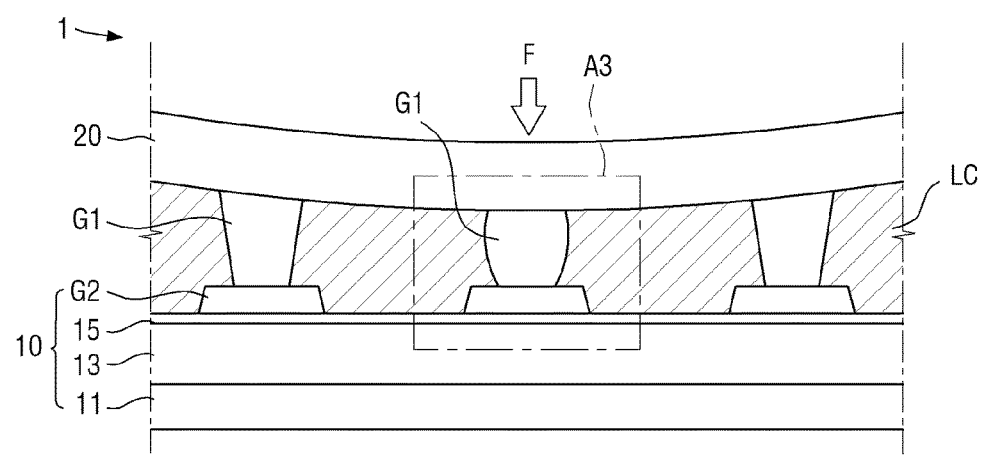
FIG. 4 is a cross-sectional view illustrating a case where an external force is applied to the display device illustrated in FIG. 1.
Figure 5:
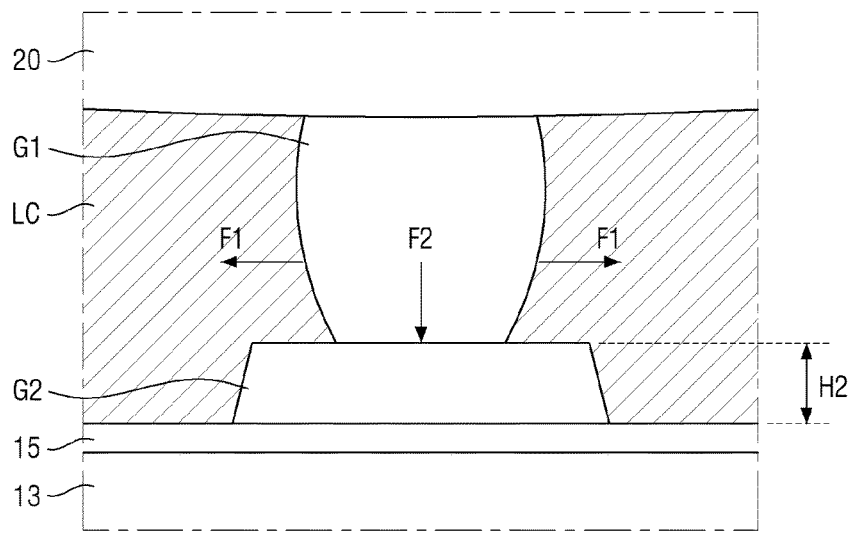
FIG. 5 is an enlarged cross-sectional view illustrating a part A3 of FIG. 4.

FIG. 4 is a cross-sectional view illustrating a case where an external force is applied to the display device illustrated in FIG. 1, and FIG. 5 is an enlarged cross-sectional view illustrating section A3 of FIG. 4.

Referring to FIGS. 4 and 5, when an external force F is applied to the display device 1, a curvature may be generated in the second substrate 20. The first spacer G1 located between the first substrate 10 and the second substrate 20 may be compressed by absorbing a part of the external force F, and a force F1 in the lateral direction may be applied by the external force F. That is, a horizontally moving force F1 acts on the first spacer G1 as a result of the force F. When the first spacer G1 moves in the lateral direction by the horizontally moving force F1, the first spacer G1 comes into direct contact with the surface of the first substrate 10 and may cause damage to the first substrate 10. Meanwhile, in the display device 1 according to the present invention, the second spacer G2 having a constant thickness H2 is located below the first spacer G1, and a normal reaction F2 as well as the horizontally moving force F1 also occurs in the first spacer G1. If an amount of force applied to the first spacer G1 is constant, a part of the force is dispersed by the normal reaction F2, and the horizontally moving force F1 is relatively reduced. Further, even when the first spacer G1 is moved in the lateral direction by an external force and does not overlap with the second spacer G2, since the thickness of the first spacer G1 is smaller than the gap between the first substrate 10 and the second substrate 20, the first spacer G1 does not come into contact with the first substrate 10. Therefore, it is possible to reduce the possibility of damage to the first substrate 10 caused by the first spacer G1.

Figure 6:
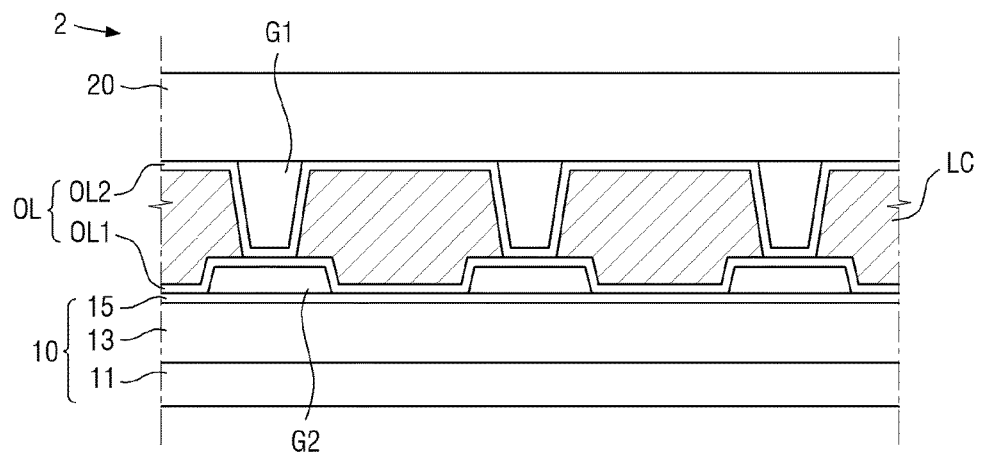
FIG. 6 is a cross-sectional view illustrating a modified embodiment of the display device illustrated in FIG. 1.

FIG. 6 is a cross-sectional view illustrating another exemplary lamination structure of the display device illustrated in FIG. 1.

Referring to FIG. 6, a display device 2 according to this embodiment is partially different from the display device (1 of FIG. 1) illustrated in FIG. 1 in that this embodiment further includes an organic layer OL located between the first spacer G1 and the second spacer G2, and other configurations are identical or similar. Therefore, in order to avoid the repeated description, specific description of the same or similar configurations will be omitted.

The organic layer OL may be located between the first spacer G1 and the second spacer G2, and more specifically, the organic layer OL may be located between the end portion of the first spacer G1 facing the first substrate 10 and the end portion of the second spacer G2 facing the second substrate 20. Further, the organic layer OL may come into direct contact with the first spacer G1 and the second spacer G2.

In some embodiments, the organic layer OL may have a two-layer structure. For example, the organic layer OL may include a first organic film OL1 that covers the tops of the barrier layer 15 and the second spacer G2, and a second organic film OL2 that covers the tops of the second substrate 20 and the first spacer G1. In the exemplary embodiment, the first organic film OL1 and the second organic layer OL2 may be, but are not limited to, being alignment films. Although it is not illustrated in the drawings, the organic layer OL may also have a single-layer structure or may have a multilayer structure of a triple layer or more.

Hereinafter, a case where the display device according to an exemplary embodiment of the present invention is a plane-line switching (PLS) type display device will be described as a non-limiting example. In addition, a structure of the display device described above in FIGS. 1 to 6 may be applied to various display devices, such as a vertical alignment (VA) type display device, a patterned vertical alignment (PVA) type display device, an in-plane switching (IPS) type display device, a fringe-field switching (FFS) type display device, a twisted nematic (TN) type display device, and other electrically-controlled birefringence (ECB) type display devices.

Further, hereinafter, a case where the display device according to an exemplary embodiment of the present inventive concept has a common electrode on bottom configuration will be described as an example and illustrated in the drawings, but it is not limited thereto. In addition, the structure of the display device described above in FIGS. 1 to 6 may also be applied to a display device having a common electrode on top configuration.

Figure 7:
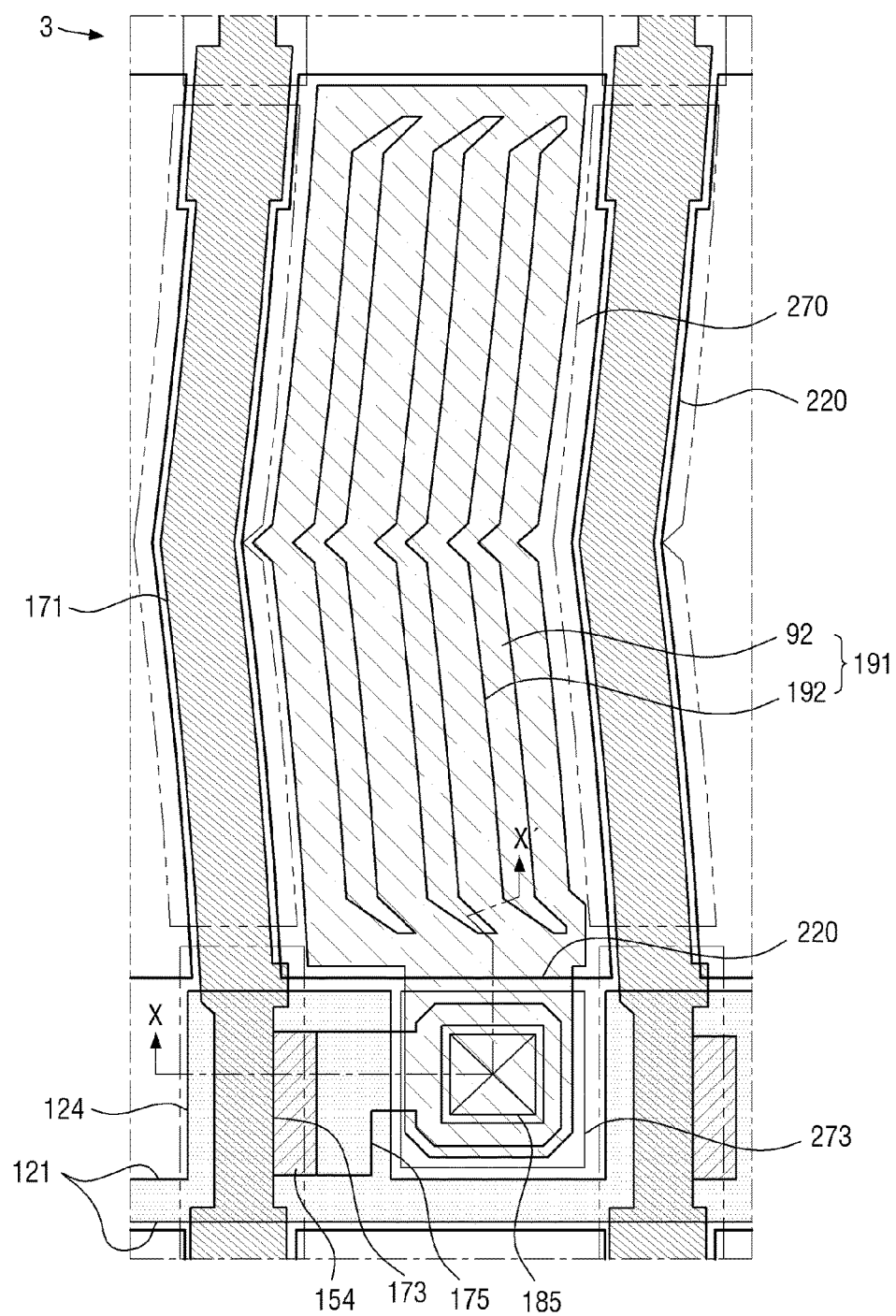
FIG. 7 is a layout diagram of a pixel of a display device according to an exemplary embodiment of the present invention.
Figure 8:
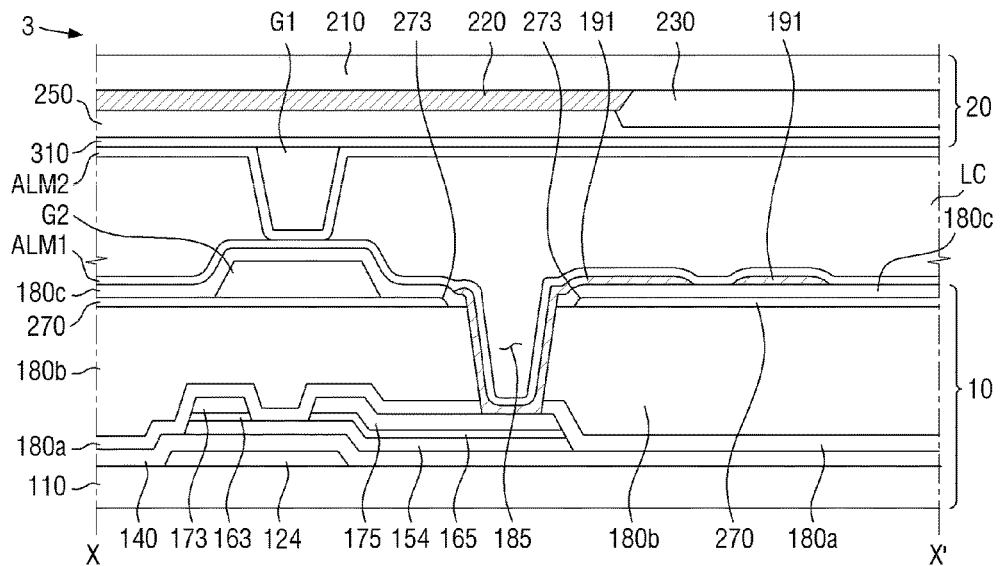
FIG. 8 is an exemplary cross-sectional view of the display device illustrated in FIG. 7 taken along the line X-X' of FIG. 7.

FIG. 7 is an arrangement diagram of a pixel of a display device according to an exemplary embodiment, and FIG. 8 is an exemplary cross-sectional view of the display device illustrated in FIG. 7 taken along the line X-X' of FIG. 7.

Referring to FIGS. 7 and 8, a display device 3 according to an exemplary embodiment may include a first substrate 10, a second substrate 20 facing the first substrate 10, a liquid crystal layer LC interposed between the first substrate 10 and the second substrate 20, and a first spacer G1 located between the first substrate 10 and the second substrate 20.

Hereinafter, the first substrate 10 will be described.

A gate conductor including a plurality of gate lines 121 may be located above a first base substrate 110 made of a transparent insulating material such as glass and plastic. The gate line 121 transmits a gate signal and may extend primarily in a horizontal direction. The gate line 121 includes a gate electrode 124. The gate line 121 may include an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). The gate line 121 may have a single layer structure or may have a multilayer structure that includes at least two conductive layers with different physical properties. Among them, one conductive film may be formed of a low-resistance metal, e.g., an aluminum-based metal, a silver-based metal, a copper-based metal or the like so as to be able to reduce signal delay or voltage drop of the gate line 121. In contrast, other conductive films may be formed of other materials, particularly, materials having excellent contact characteristics with indium tin oxide (ITO) and indium zinc oxide (IZO), e.g., a molybdenum-based metal, chromium, titanium, tantalum or the like. An example of the combinations thereof may include a chromium lower film and an aluminum upper film, and an aluminum lower film and a molybdenum upper film. However, the present inventive concept is not limited thereto, and the gate line 121 may be formed of various types of metals and conductors.

A gate insulating film 140 may be located on the gate line 121 or the gate conductor. The gate insulating film 140 may be made of an insulating material, and as an example, it may be formed of silicon nitride or silicon oxide. The gate insulating film 140 may also have a single layer structure or may have a multilayer structure that includes at least two insulating layers with different physical properties.

A semiconductor layer 154 may be located on the gate insulating film 140 and may at least partially overlap with the gate electrode 124. The semiconductor layer 154 may include amorphous silicon, polycrystalline silicon or an oxide semiconductor.

Ohmic contact members 163, 165 may be located on the semiconductor layer 154. The ohmic contact members 163 and 165 may be formed of an n+ hydrogenated amorphous silicon doped with n-type impurity at a high concentration, or may be formed of silicide.

The ohmic contact members 163, 165 may be located on the semiconductor layer 154 in pairs. In some embodiments, when the semiconductor layer 154 is an oxide semiconductor, the ohmic contact members 163, 165 may be omitted.

A data conductor that includes a data line 171 including a drain electrode 175 and a source electrode 173 is formed above the ohmic contact members 163,165 and the gate insulating film 140.

The data line 171 may transmit data signals and may extend mainly in the vertical direction to intersect with the gate line 121. In some embodiments, the data line 171 may be periodically curved for improvement in the permeability.

The data line 171 may include a source electrode 173. In some embodiments, as illustrated in FIG. 7, the source electrode 173 does not protrude from the data line 171 and may be located on the substantially same line as the data line 171.

The drain electrode 175 faces the source electrode 173. The drain electrode 175 may include a rod-like portion extending substantially in parallel with the source electrode 173, and an extension on the opposite side thereof. The drain electrode 175 and the source electrode 173 may be located on the semiconductor layer 154 to be spaced apart from each other, and the semiconductor layer 154 may be partially exposed in a part between the drain electrode 175 and the source electrode 173.

The above-described data conductor may be formed of aluminum, copper, silver, molybdenum, chromium, titanium, tantalum or alloys of them, and may also have a multilayer structure that includes a lower film (not illustrated) such as a refractory metal, and a low-resistance upper film (not illustrated) formed thereon, but it is not limited thereto. The data line 171 and the drain electrode 175 may be made of various metals or conductors.

The gate electrode 124, the source electrode 173 and the drain electrode 175 may form a single thin film transistor (TFT), together with the semiconductor layer 154.

A first passivation layer 180a may be located on the exposed portions of the data conductor, the gate insulating film 140 and the semiconductor layer 154. The first passivation layer 180a may be formed of an organic insulating material or an inorganic insulating material.

An insulating layer 180b may be located on the first passivation layer 180a. In some embodiments, the insulating layer 180b may have a function of flattening the top of the first passivation layer 180a. The insulating layer 180b may be formed of an organic insulating material, and in some embodiments, the insulating layer 180b may be formed of a photosensitive organic insulating material, but not limited thereto.

A first electrode 270 may be located on the insulating layer 180b. In some embodiments, the first electrode 270 may be a common electrode. The first electrode 270 is a plane type and may be formed on the first base substrate 110 as a plate, and it may receive transmission of the common voltage of a predetermined magnitude. In some embodiments, the first electrode 270 may be made of a transparent conductive material, and as an example, the transparent conductive material may be ITO, IZO, ITZO, AZO or the like.

The first electrode 270 may have an opening 273 formed in a region corresponding to a part of the drain electrode 175.

A second spacer G2 protruding toward the second substrate 20 may be located on the first electrode 270. As described above in the description of FIGS. 1 to 6, the second spacer G2 may be formed of a material having an etch rate greater than that of the first electrode 270. The first electrode 270 may have the function of the barrier layer (15 of FIG. 1) described above in the description of FIGS. 1 to 6. That is, the first electrode 270 may prevent damage to the insulating layer 180b that may be caused in the process of formation of the second spacer G2. Moreover, in some embodiments, similarly to the barrier layer (15 of FIG. 1) described above in the description of FIGS. 1 to 6, the first electrode 270 may include a first portion that overlaps with the second spacer G2, and a second portion except the first portion, and features such as the thickness of the first portion and the thickness of the second portion may be substantially identical or similar to the barrier layer (15 of FIG. 1).

The second spacer G2 may overlap with a light-shielding member 220 to be described later. Moreover, in some embodiments, the second spacer G2 may be disposed to overlap with a thin film transistor that includes the gate electrode 124, the semiconductor layer 154, the source electrode 173 and the drain electrode 175.

In an exemplary embodiment, the second spacer G2 may be made of an insulating material such as an organic insulating material. Moreover, in some embodiments, when the insulating layer 180b is made of an organic insulating material, the second spacer G2 may also be made of the same material as the insulating layer 180b, but it is not limited thereto. The second spacer G2 may also be formed of a material different from the insulating layer 180b.

Otherwise, in another exemplary embodiment, the second spacer G2 may also be formed of a conductor. For example, the second spacer G2 may be formed of a low-resistance metal such as an aluminum-based metal, a silver-based metal and a copper-based metal. When the first electrode 270 is made of a transparent conductor such as ITO, an RC delay of a large level may be generated due to the resistance of the transparent conductor itself. When the second spacer G2 is formed of a conductor, the second spacer G2 comes into direct contact with the first electrode 270, the second spacer may reduce the resistance of the first electrode 270, making it possible to reduce the RC delay.

A second passivation layer 180c may be located on the first electrode 270 and the second spacer G2. The second passivation layer 180c may be made of an organic insulating material or an inorganic insulating material.

A contact hole 185 that exposes the drain electrode 175 may be formed in the first passivation layer 180a, the insulating layer 180b and the second passivation layer 180c. The contact hole 185 may be located inside the opening 273 of the first electrode 270, as illustrated in the drawings. That is, the opening 273 of the first electrode 270 may surround the contact hole 185.

A second electrode 191 may be located above the second passivation layer 180c. In some embodiments, the second electrode 191 may be a pixel electrode. The second electrode 191 may at least partially overlap with the first electrode 270. The second electrode 191 may include a plurality of branch electrodes 192 that overlap with the first electrode 270, and a slit 92 may be formed between the adjacent branch electrodes 192.

In some embodiments, the branch electrodes 192 of the second electrode 191 may extend substantially in parallel with the data line 171. The branch electrodes 192 may be tilted to form an oblique angle in the vertical direction and may be bent in a horizontal center line (not illustrated) of the second electrode 191. Thus, the second electrode 191 may be divided into a plurality of domains in which inclined directions of the branch electrodes 192 are different from each other. For example, an upper branch electrode 192 extends in a right upward direction on the basis of the horizontal center line, and a lower branch electrode 192 extends in a right downward direction.

A part of the second electrode 191 is connected to the drain electrode 175 through the contact hole 185 and may receive application of a voltage from the drain electrode 175.

The second electrode 191 may be made of a transparent conductive material such as ITO, IZO, ITZO and AZO.

Meanwhile, in another embodiment, the second electrode 191 may be a plane type, and the first electrode 270 may include a plurality of branch electrodes (not illustrated) that overlap with the second electrode 191. In addition, the structures and arrangements of the first electrode 270 and the second electrode 191 may be adjusted.

In some embodiments, a first alignment film ALM1 may be further located above the first substrate 10, and more specifically, on the second passivation layer 180c and the second electrode 191. The first alignment film ALM1 may be made of an organic material such as polyimide, but it is not limited thereto. In some embodiments, the first alignment film ALM1 may be a horizontal alignment film, and may be rubbed in a certain direction. Otherwise, the first alignment film ALM1 may include a photo reactive material and may be optically aligned.

Hereinafter, the second substrate 20 and the first spacer G1 will be described.

The second substrate 20 may include a second base substrate 210, a light-shielding member 220 and a color filter 230, and may further include at least one of an overcoat layer 250 and an upper barrier layer 310.

The light-shielding member 220 may be located above the second base substrate 210. In some embodiments, the light-shielding member 220 may be superimposed with a thin film transistor that includes the gate electrode 124, the semiconductor layer 154, the source electrode 173 and the drain electrode 175, the contact hole 185, the gate line 121 and the data line 171. The light-shielding member 220 may include a light-shielding pigment such as carbon black, and may contain a photosensitive organic material.

A plurality of color filters 230 may be located above the second base substrate 210. The color filters 230 may at least partially overlap with the second electrode 191. The color filters 230 may be formed of a material that contains the pigment for implementing colors on the photosensitive organic composition. For example, the color filter 230 may include, but is not limited to, any one of red, green and blue pigments in the photosensitive organic composition.

An overcoat layer 250 may be located above the color filters 230 and the light-shielding member 220. In some embodiments, the overcoat layer 250 may be made of an organic insulating material. The overcoat layer 250 may also be omitted if necessary.

The first spacer G1 may be located on a surface of the second substrate 20 facing the first substrate 10, and may protrude toward the first substrate 10. In some embodiments, the first spacer G1 may be made of an organic insulating material, and may have photosensitivity. Moreover, in some embodiments, the first spacer G1 may also include a light-shielding pigment. The first spacer G1 may overlap with the second spacer G2, and may also overlap with the light-shielding member 220.

In some embodiments, an upper barrier layer 310 may be further located on the overcoat layer 250, and the first spacer G1 may also be located on the upper barrier layer 310. Similarly to the barrier layer (15 of FIG. 1) described above in the description of FIGS. 1 to 6, the upper barrier layer 310 may prevent damages that may be generated in the overcoat layer 250, the light-shielding member 220 and the color filter 230 in the forming process of the first spacer G1 to protect the overcoat layer 250. The upper barrier layer 310 may be formed of a material having an etch rate smaller than that of the first spacer G1, and may be made of a light-transmitting material. When the overcoat layer 250 is omitted, the upper barrier layer 310 may be located on the light-shielding member 220 and the color filter 230.

A second alignment film ALM2 may be further located on the second substrate 20 and the first spacer G1. In some embodiments, the second alignment film ALM2 may include, but is not limited to, an organic material. Other descriptions of the second alignment film ALM2 are substantially the same as or similar to those in the case of the first alignment film ALM1.

In some embodiments, the first alignment film ALM1 and the second alignment film ALM2 may be in contact with each other between the first spacer G1 and the second spacer G2, but it is not limited thereto. Depending on changes in the structure, in a portion between the first spacer G1 and the second spacer G2, only one of the first alignment film ALM1 and the second alignment film ALM2 may be located. As an example, when only the first alignment film ALM1 is located in a portion between the first spacer G1 and the second spacer G2, the first alignment film ALM1 may come into direct contact with the first spacer G1 and the second spacer G2 between the first spacer G1 and the second spacer G2. Otherwise, depending on changes in the structure, both of the first alignment film ALM1 and the second alignment film ALM2 may also be absent in the portion between the first spacer G1 and the second spacer G2. In this case, the first spacer G1 and the second spacer G2 may also be in direct contact with each other.

Hereinafter, the same components as the above-described embodiment will be denoted by the same reference numerals. Also, the repeated description will be omitted, and the differences will be mainly described.

Figure 9:
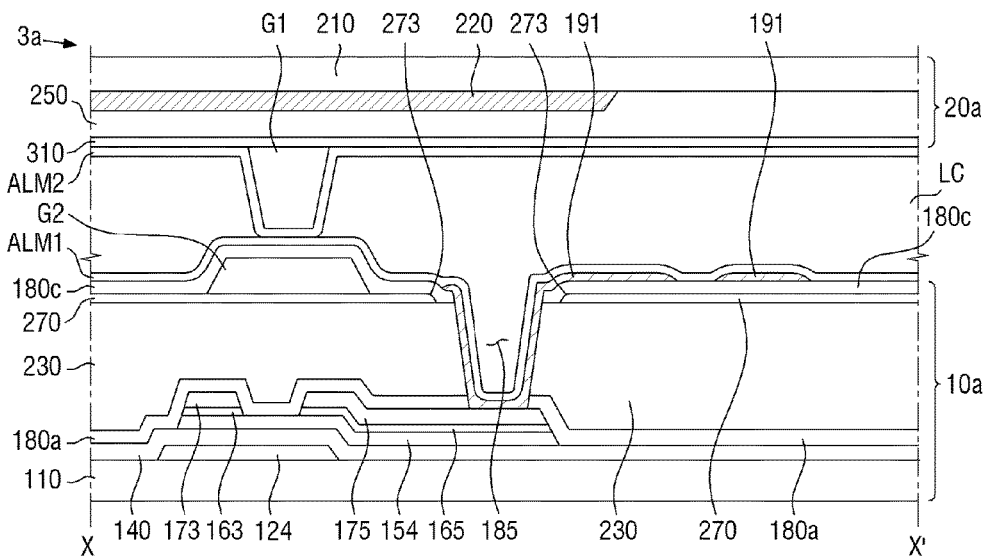
FIG. 9 is another exemplary cross-sectional view of the display device illustrated in FIG. 7 taken along the line X-X' of FIG. 7.

FIG. 9 is another exemplary cross-sectional view of the display device illustrated in FIG. 7 taken along the line X-X' of FIG. 7.

Referring to FIGS. 7 and 9, a display device 3a according to the present exemplary embodiment may include a first substrate 10a, a second substrate 20a, a liquid crystal layer LC and a first spacer G1.

Unlike the first substrate (10 of FIG. 8) described above in FIGS. 7 and 8, a color filter 230 may be located on the first passivation layer 180a of the first substrate 10a, and the first electrode 270 may be located on the color filter 230.

The second substrate 20a may include a second base substrate 210 and a light-shielding member 220, and may further include at least any one of an overcoat layer 250 and an upper barrier layer 310.

That is, the display device 3a according to this embodiment is significantly different from the display device (3 of FIG. 8) described above in the description of FIGS. 7 and 8 in that the color filter 230 is located on the first substrate 10a side. Some other aspects of configurations may be substantially the same as the embodiment of FIG. 8.

Figure 10:
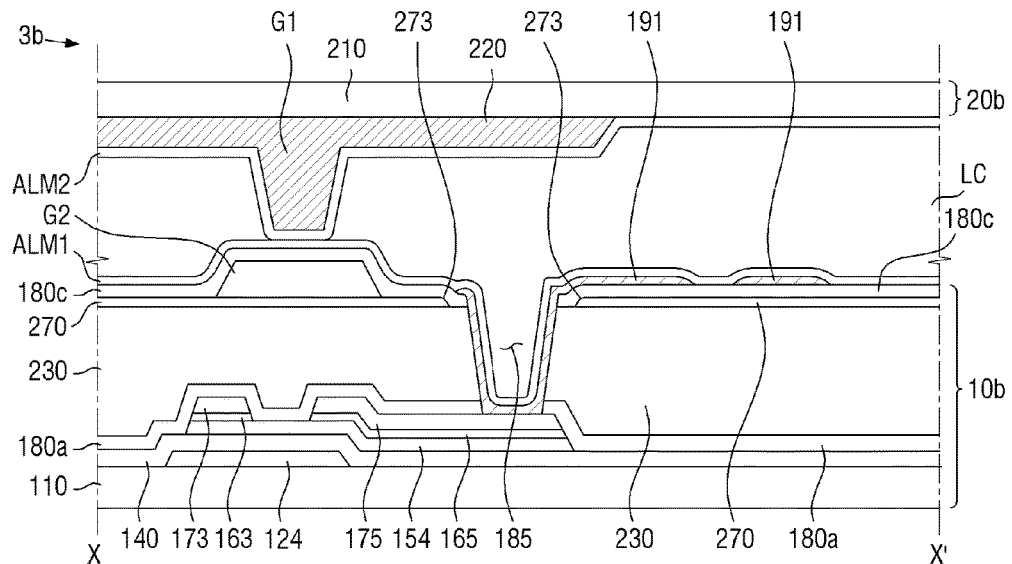
FIG. 10 is still another exemplary cross-sectional view of the display device illustrated in FIG. 7 taken along the line X-X' of FIG. 7.

FIG. 10 is another exemplary cross-sectional view of the display device illustrated in FIG. 7 taken along the line X-X' of FIG. 7.

Referring to FIGS. 7 and 10, a display device 3b according to this embodiment includes a first substrate 10b, a second substrate 20b, a liquid crystal layer LC and a first spacer G1.

The first substrate 10b may be substantially the same as the first substrate (10a of FIG. 9) as described above in the description of FIG. 9.

The second substrate 20b may include a second base substrate 210 and a light-shielding member 220. The second substrate 20b is different from the second substrate (20 in FIG. 8) described above in the description of FIG. 8 and the second substrate (20a in FIG. 9) described above in the description of FIG. 9 in that the second substrate 20b does not include the color filter 230 and does not include the overcoat layer 250 and the upper barrier layer 310.

Unlike the description of FIGS. 7 and 8, the first spacer G1 may be located just above the light-shielding member 220 and may contain the light-shielding material. The light-shielding material may contain a pigment such as black carbon, and may contain a photosensitive organic material. In some embodiments, the first spacer G1 may be made of the same material as the light-shielding member 220, and may be formed integrally with the light-shielding member 220. Moreover, in some embodiments, the first spacer G1 and the light-shielding member 220 may be formed through the same process, for example, through a photolithography process using a single halftone mask.

Moreover, in some embodiments, a second alignment film ALM2 may be located above second substrate 20b and above first spacer G1. More specifically, the second alignment film ALM2 may be located above second base substrate 210, above the light-shielding member 220 and above the first spacer G1.

That is, the display device 3b according to this embodiment is significantly different from the display device (3a in FIG. 9) described above in FIG. 9 in that the first spacer G1 contains a light-shielding material and the first spacer G1 and the light-shielding member 220 may be made of the same material, and other configurations may be substantially the same.

Figure 11:
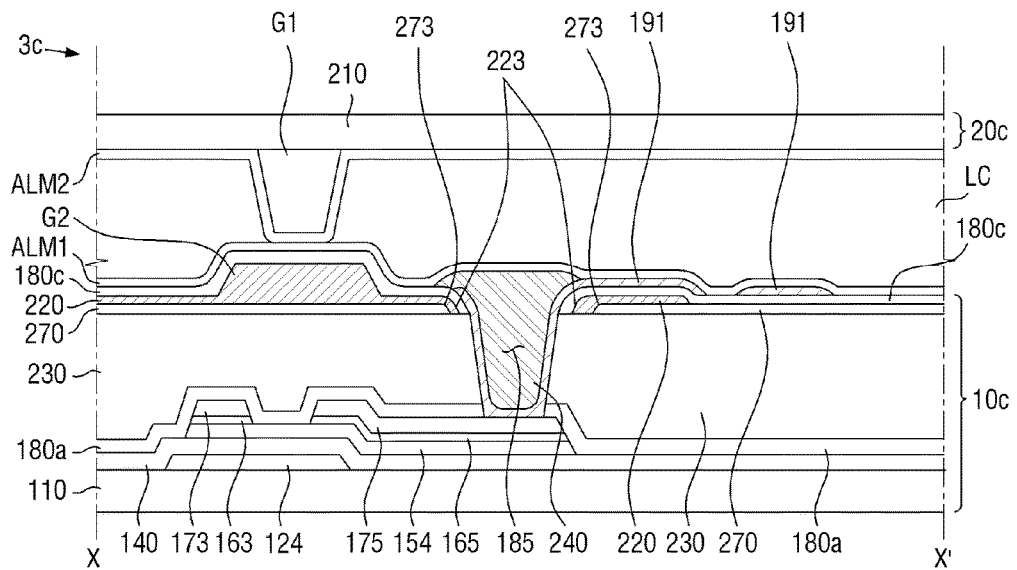
FIG. 11 is still another exemplary cross-sectional view of the display device illustrated in FIG. 7 taken along the line X-X' of FIG. 7.

FIG. 11 is still another exemplary cross-sectional view of the display device illustrated in FIG. 7 taken along the line X-X' of FIG. 7.

Referring to FIGS. 7 and 11, a display device 3c according to this embodiment may include a first substrate 10c, a second substrate 20c, a liquid crystal layer LC and a first spacer G1, and may further include an auxiliary light-shielding member 240.

Unlike the first substrate (10a in FIG. 9) described above in FIG. 9, in the first substrate 10c, a light-shielding member 220 may be located on the first electrode 270, and the second spacer G2 may be located on the light-shielding member 220. Further, a second passivation layer 180c may be located on the light-shielding member 220 and the second spacer G2.

The light-shielding member 220 may at least partially overlap with a thin film transistor, and may not overlap with the contact hole 185. That is, the light-shielding member 220 includes a portion that covers the thin film transistor, and may include an opening 223 formed in a region corresponding to a part of the drain electrode 175.

The first electrode 270 may have an opening 273 formed in a region corresponding to a part of the drain electrode 175. Although FIG. 11 illustrates a state in which the opening 273 of the first electrode 270 is greater than the opening 223 of the light-shielding member 220 to surround the opening 223 of the light-shielding member 220, this is not a limitation of the inventive concept. In some embodiments, the opening 273 of the first electrode 270 may be smaller than the opening 223 of the light-shielding member 220, and an outer boundary of the opening 273 of the first electrode 270 and an outer boundary of the opening 223 of the light-shielding member 273 may also at least partially overlap with each other.

The auxiliary light-shielding member 240 may provide a flat surface by filling up a large step around the contact hole 185. Further, since the light-shielding member 220 is removed to form the opening 223 around the contact hole 185, a light leakage may occur around the contact hole 185. However, according to this embodiment, the auxiliary light-shielding member 240 may be formed so as to overlap with the opening 223 of the light-shielding member 220 to prevent a light leakage around the contact hole 185. The auxiliary light-shielding member 240 may contain a light-shielding material. As an example, the auxiliary light-shielding member 240 may contain a pigment such as carbon black, and may contain a photosensitive organic material.

The second spacer G2 may contain the light-shielding material. The light-shielding material may contain a pigment such as black carbon, and may contain a photosensitive organic material. In some embodiments, the second spacer G2 may be made of the same material as the light-shielding member 220 and may be formed integrally with the light-shielding member 220. The second spacer G2 may be formed in the same process as the light-shielding member 220.

The second substrate 20c may include a second base substrate 210. The second substrate 20c is different from the second substrate (20 in FIG. 8) described above in the description of FIG. 8 and the second substrate (20a in FIG. 9) described above in the description of FIG. 9 in that the second substrate 20c does not include the light-shielding member 220 and the color filter 230, and does not include the overcoat layer 250 and the upper barrier layer 310.

The first spacer G1 may be located just above the first base substrate 210 and may be in contact with the first base substrate 210. In some embodiments, the first spacer G1 may be made of an organic insulating material and may be made of a photosensitive organic insulating material. Moreover, in some embodiments, the first spacer G1 may also contain a light-shielding material.

In some embodiments, a first alignment film ALM1 may be located above the first substrate 10c, and more specifically, on the second passivation layer 180c, the auxiliary light-shielding member 240 and the second electrode 191.

Moreover, in some embodiments, a second alignment film ALM2 may be further located above the second substrate 20c and above the first spacer G1. More specifically, the second alignment film ALM2 may be located above the second base substrate 210 and above the first spacer G1.

That is, the display device 3c according to this embodiment is significantly different from the display device 3a described above in FIG. 9 in that the light-shielding member 220 is located on the first substrate 10c side, the second spacer G2 may contain a light-shielding material, and the second spacer G2 and the light-shielding member 220 are formed of the same material and may be formed integrally with each other, and other configurations may be substantially the same.

According to this embodiment, by locating the color filter 230 and the light-shielding member 220 on the first substrate 10c, together with a thin film transistor, it is easy to adjust an alignment between the light-shielding member 220 and the color filter 230, and an alignment between the second electrode 191 and the thin film transistor. Therefore, it is possible to reduce an alignment error, prevent a light leakage or a decrease in aperture ratio due to misalignment between the components and enhance the transmittance.

Figure 12:
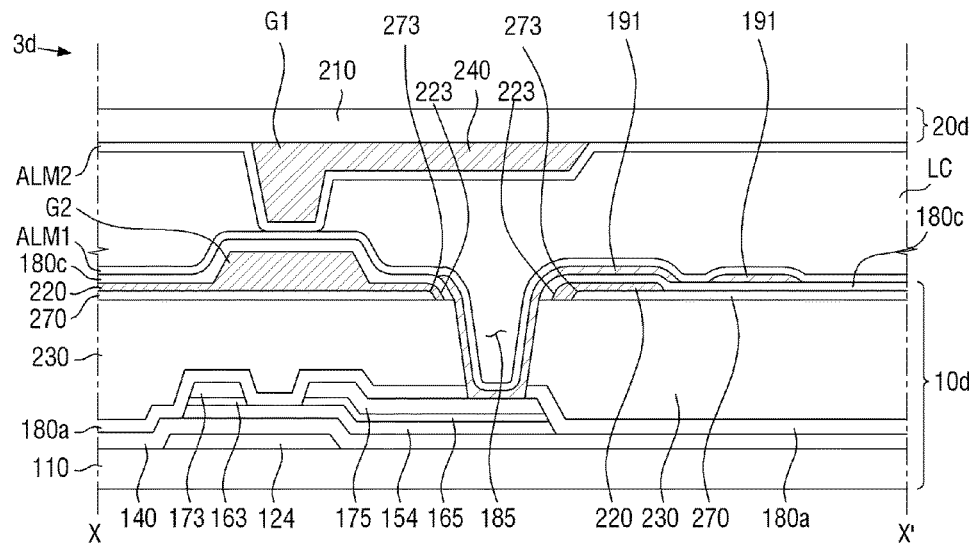
FIG. 12 is still another exemplary cross-sectional view of the display device illustrated in FIG. 7 taken along the line X-X' of FIG. 7.

FIG. 12 is still another exemplary cross-sectional view of the display device illustrated in FIG. 7 taken along the line X-X' in FIG. 7.

Referring to FIGS. 7 and 12, a display device 3d according to this embodiment may include a first substrate 10d, a second substrate 20d, a liquid crystal layer LC and a first spacer G1, and may further include an auxiliary light-shielding member 240.

Unlike the first substrate (10c in FIG. 11) described in FIG. 11, the first substrate 10d may not include an auxiliary light-shielding member 240, and other configurations may be substantially the same.

In some embodiments, a first alignment film ALM1 may be further located above the first substrate 10d, and more specifically, on the second passivation layer 180c and the second electrode 191.

The second substrate 20d may include a second base substrate 210, and an auxiliary light-shielding member 240 located on the second base substrate 210. The auxiliary light-shielding member 240 may be formed to overlap with the opening 223 of the light-shielding member 220 to prevent the light leakage around the contact hole 185. The auxiliary light-shielding member 240 may contain a light-shielding material.

The first spacer G1 may be located on the second base substrate 210. In some embodiments, the first spacer G1 may contain the light-shielding material and may be formed of the same material as the auxiliary light-shielding member 240. Further, the first spacer G1 and the auxiliary light-shielding member 240 may be formed through the same process, for example, through a photolithography process using a single halftone mask. In some embodiments, as illustrated in FIG. 12, the first spacer G1 may be formed integrally with the auxiliary light-shielding member 240. However, this is not a limitation of the inventive concept. The auxiliary light-shielding member 240 and the first spacer G1 may also be separated from each other.

In some embodiments, a second alignment film ALM2 may be located above the second substrate 20d and above the first spacer of G1. More specifically, the second alignment film ALM2 may be located above the second base substrate 210, above the auxiliary light-shielding member 240 and above the first spacer G1.

Figure 13:
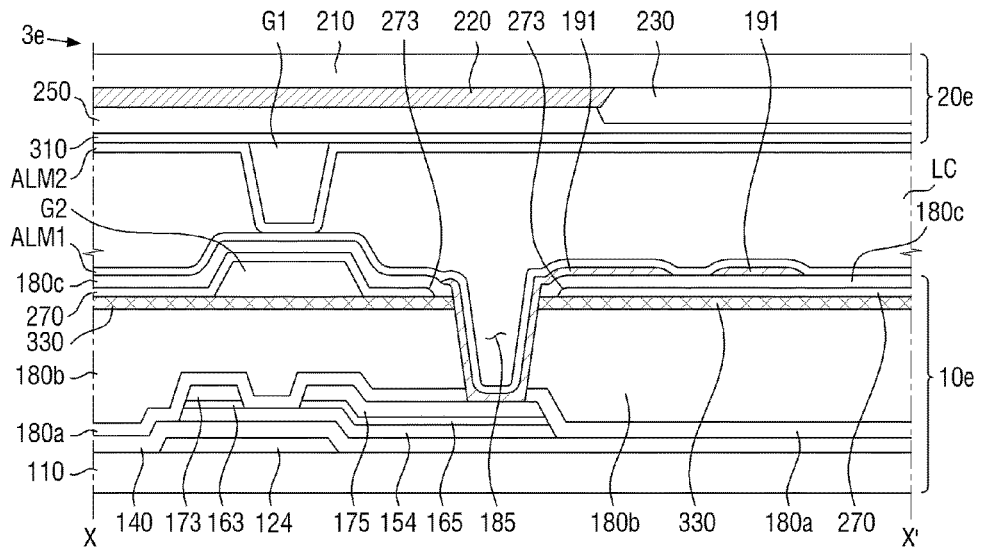
FIG. 13 is still another exemplary cross-sectional view of the display device illustrated in FIG. 7 taken along the line X-X' of FIG. 7.

FIG. 13 is still another exemplary cross-sectional view of the display device illustrated in FIG. 7 taken along the line X-X' in FIG. 7.

Referring to FIGS. 7 and 13, a display device 3e according to this embodiment may include a first substrate 10e, a second substrate 20e, a liquid crystal layer LC and a first spacer G1.

Unlike the first substrate (10 in FIG. 8) described above in the description of FIGS. 7 and 8, a first substrate 10e may further include a barrier layer 330 located on the insulating layer 180b. The barrier layer 330 may prevent the insulating layer 180b from being damaged or etched in the forming process of the second spacer G2 which will be described later. Further, in some embodiments, similarly to the barrier layer 15 described above in the description of FIGS. 1 to 6, the barrier layer 330 may include a first portion that overlaps with the second spacer G2, and a second portion outside the first portion. Features such as the thickness of the first portion and the thickness of the second portion may be substantially identical or similar to the barrier layer 15 of FIG. 1.

The second spacer G2 may be located on the barrier layer 330, and may protrude toward the second substrate 20e.

The second electrode 270 may be located on the barrier layer 330 and the second spacer G2. A portion of the second electrode 270 located on the second spacer G2 may protrude toward the second substrate 20e due to its own thickness.

The second spacer G2 may be made of a material having an etch rate higher than that of the barrier layer 330. In some embodiments, the second spacer G2 is made of an organic insulating material, and the barrier layer 330 may be made of an inorganic insulating material. As an example, the inorganic insulating material may be silicon oxide, silicon oxynitride, silicon nitride or the like. Otherwise, in another embodiment, the second spacer G2 may also be formed of a conductor. For example, the second spacer G2 may be made of a low-resistance metal such as an aluminum-based metal, a silver-based metal and a copper-based metal, and may be in direct contact with the first electrode 270 made of a transparent conductor such as ITO to reduce the resistance of the first electrode 270.

The second substrate 20e may be substantially the same as the second substrate 20 described above in reference to FIGS. 7 and 8.

Since the first spacer G1, the first alignment film ALM1, the second alignment film ALM2 and the like are the same as those described above in the description of FIGS. 7 and 8, the description thereof will be omitted.

Figure 14:
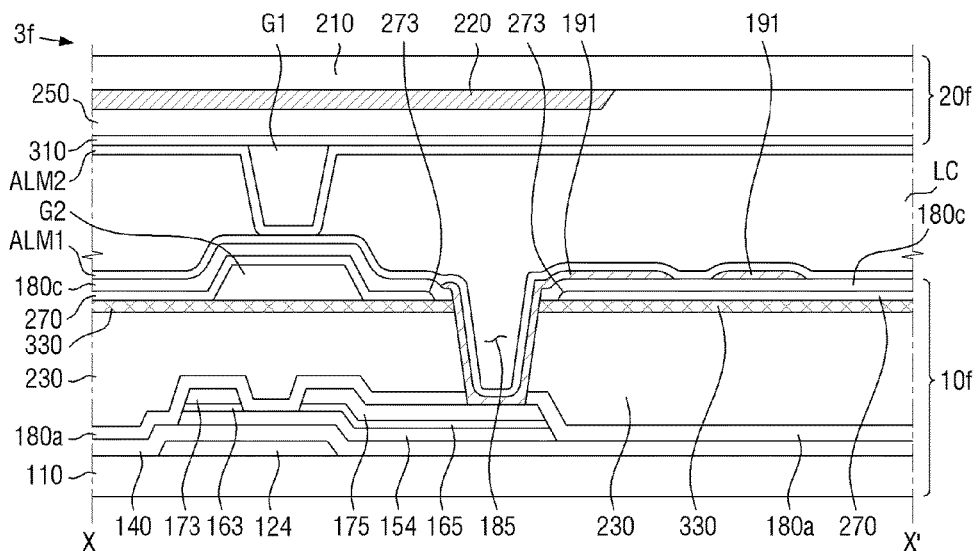
FIG. 14 is still another exemplary cross-sectional view of the display device illustrated in FIG. 7 taken along the line X-X' of FIG. 7.

FIG. 14 is still another exemplary cross-sectional view of a display device illustrated in FIG. 7 taken along the line X-X' in FIG. 7.

Referring to FIGS. 7 and 14, a display device 3f according to this embodiment may include a first substrate 10f, a second substrate 20f, a liquid crystal layer LC and a first spacer G1.

Unlike the first substrate (10e in FIG. 13) as described above in the description of FIG. 13, a color filter 230 may be located on the first passivation layer 180a of the first substrate 10f, and a barrier layer 330 may be located on the color filter 230.

The second substrate 20f may include a second base substrate 210 and a light-shielding member 220, and may further include at least any one of an overcoat layer 250 and an upper barrier layer 310.

That is, the display device 3f according to this embodiment is significantly different from the display device (3e in FIG. 13) described above in FIG. 13 in that the color filter 230 is located in the first substrate 10f, and other configuration may be substantially the same.

Figure 15:
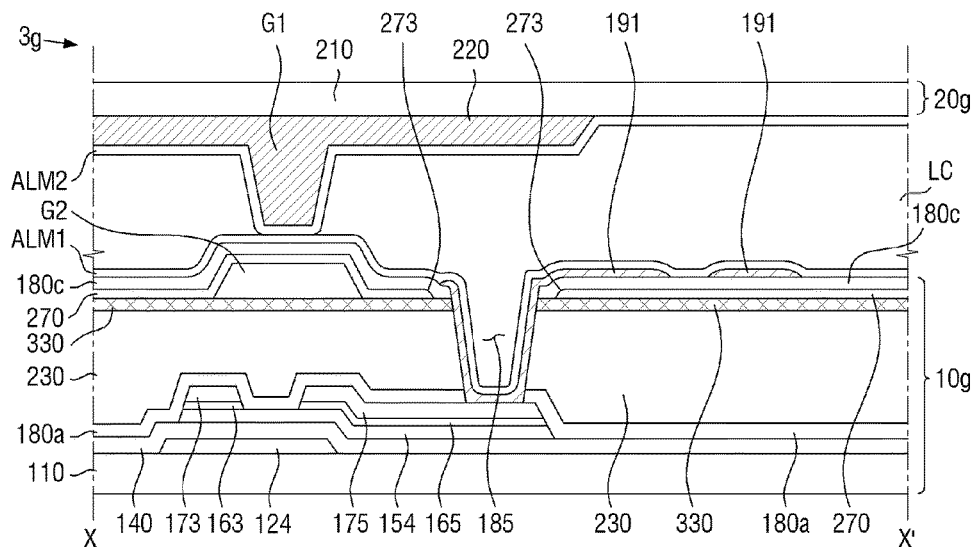
FIG. 15 is still another exemplary cross-sectional view of the display device illustrated in FIG. 7 taken along the line X-X' of FIG. 7.

FIG. 15 is still another exemplary cross-sectional view of a display device illustrated in FIG. 7 taken along the line X-X' in FIG. 7.

Referring to FIGS. 7 and 15, a display device 3g according to this embodiment may include a first substrate 10g, a second substrate 20g, a liquid crystal layer LC and a first spacer G1.

The first substrate 10g may be substantially the same as the first substrate 10f described above in reference to FIG. 14.

The second substrate 20g may include a second base substrate 210 and a light-shielding member 220, and may not include a color filter 230, an overcoat layer 250 and an upper barrier layer 310.

The first spacer G1 may be located just above the light-shielding member 220, and may contain a light-shielding material. In some embodiments, the first spacer G1 may be made of the same material as the light-shielding member 220, and may be formed integrally with the light-shielding member 220. The first spacer G1 may be formed by the same process as the light-shielding member 220.

In some embodiments, a second alignment film ALM2 may be located above the second substrate 20g and above the first spacer G1. More specifically, the second alignment film ALM2 may be located above the second base substrate 210, above the light-shielding member 220 and above the first spacer G1.

Figure 16:
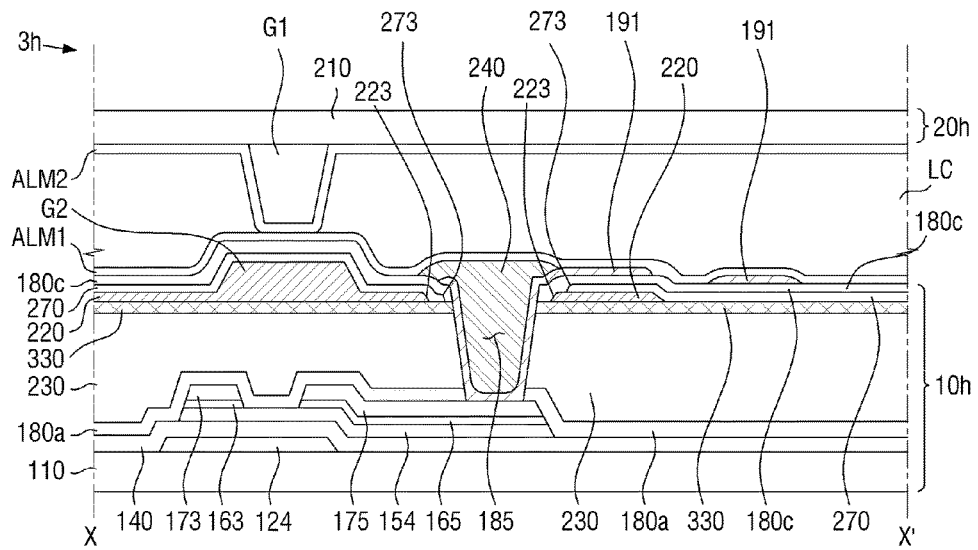
FIG. 16 is still another exemplary cross-sectional view of the display device illustrated in FIG. 7 taken along the line X-X' of FIG. 7.

FIG. 16 is still another exemplary cross-sectional view of a display device illustrated in FIG. 7 taken along the line X-X' in FIG. 7.

Referring to FIGS. 7 and 16, a display device 3h according to this embodiment may include a first substrate 10h, a second substrate 20h, a liquid crystal layer LC and a first spacer G1, and may further include an auxiliary light-shielding member 240.

Unlike the first substrate 10f described above in FIG. 14, in the first substrate 10h, the light-shielding member 220 may be located on the barrier layer 330, and the second pacer G2 may be located on the light-shielding member 220. Further, the first electrode 270 may be located on the light-shielding member 220 and the second spacer G2.

The light-shielding member 220 may at least partially overlap with the thin film transistor, and may not at least partially overlap with the contact hole 185. That is, the light-shielding member 220 includes a portion that covers the thin film transistor, and may include an opening 223 that is formed in a region corresponding to a part of the drain electrode 175.

The first electrode 270 may have an opening 273 that is formed in a region corresponding to a part of the drain electrode 175. FIG. 11 illustrates a state in which an outer boundary of the opening 273 of the first electrode 270 and an outer boundary of the opening 223 of the light-shielding member 220 at least partially overlap with each other, but it is not limited thereto. The opening 273 of the first electrode 270 may be greater than the opening 223 of the light-shielding member 220 to surround the opening 223 of the light-shielding member 220, and the opening 273 of the first electrode 270 may also be smaller than the opening 223 of the light-shielding member 220 depending on the embodiment.

The auxiliary light-shielding member 240 may flatten a surface by filling up the step around the contact hole 185. The auxiliary light-shielding member 240 is formed so as to overlap with the opening 223 of the light-shielding member 220, and may prevent a light leakage around the contact hole 185. The auxiliary light-shielding member 240 may contain a light-shielding material. As an example, the auxiliary light-shielding member 240 may contain a pigment such as carbon black, and may contain a photosensitive organic material.

The second spacer G2 may contain the light-shielding material. The light-shielding material may contain a pigment such as black carbon, and may contain a photosensitive organic material. In some embodiments, the second spacer G2 may be made of the same material as the light-shielding member 220, and may be formed integrally with the light-shielding member 220. The second spacer G2 may be formed by the same process as the light-shielding member 220.

The second substrate 20h may include a second base substrate 210.

The first spacer G1 may be located just above the first base substrate 210 and may be in contact with the first base substrate 210. In some embodiments, the first spacer G1 may be made of an organic insulating material and may be made of a photosensitive organic insulating material. Moreover, in some embodiments, the first spacer G1 may also contain the light-shielding material.

In some embodiments, a first alignment film ALM1 may be further located above the first substrate 10h, and more specifically, on the second passivation layer 180c, the auxiliary light-shielding member 240 and the second electrode 191.

Moreover, in some embodiments, a second alignment film ALM2 may be further located above the second substrate 20h and above the first spacer G1. More specifically, the second alignment film ALM2 may be located above the second base substrate 210 and above the first spacer G1.

Figure 17:
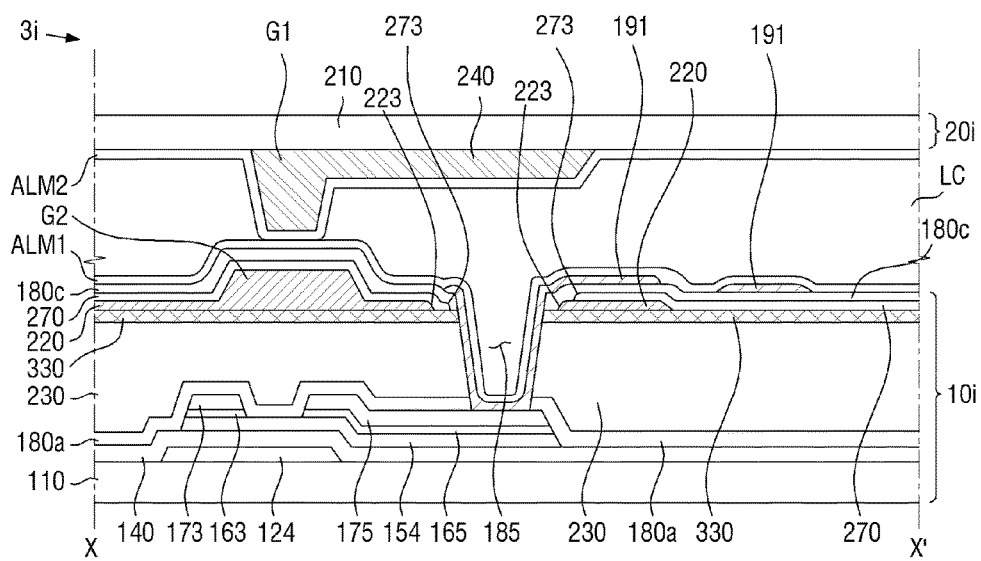
FIG. 17 is still another exemplary cross-sectional view of the display device illustrated in FIG. 7 taken along the line X-X' of FIG. 7.

FIG. 17 is still another exemplary cross-sectional view of a display device illustrated in FIG. 7 taken along the line X-X' in FIG. 7.

Referring to FIGS. 7 and 17, a display device 3i according to this embodiment may include a first substrate 10i, a second substrate 20i, a liquid crystal layer LC and a first spacer G1, and may further include an auxiliary light-shielding member 240.

Unlike the first substrate (10h in FIG. 16) described in FIG. 16, the first substrate 10i may not include the auxiliary light-shielding member 240, and other configurations may be substantially the same.

In some embodiments, a first alignment film ALM1 may be further located above the first substrate 10i, and more specifically, on the second passivation layer 180c and the second electrode 191.

The second substrate 20i may be substantially the same as the second substrate (3d in FIG. 12) as described above in the description of FIG. 12. That is, the second substrate 20i may include a second base substrate 210, and an auxiliary light-shielding member 240 located on the second base substrate 210. The auxiliary light-shielding member 240 may be formed to overlap with the opening 223 of the light-shielding member 220 to prevent the light leakage around the contact hole 185, and the auxiliary light-shielding member 240 may contain a light-shielding material.

The first spacer G1 may be located on the second base substrate 210. In some embodiments, the first spacer G1 may contain the light-shielding material and may be made of the same material as the auxiliary light-shielding member 240. The first spacer G1 may be formed in the same process as the auxiliary light-shielding member 240. The first spacer G1 may be formed integrally with the auxiliary light-shielding member 240 as illustrated in FIG. 17, but it is not limited thereto, and the auxiliary light-shielding member 240 and the first spacer G1 may also be separated from each other.

In some embodiments, a second alignment film ALM2 may be further located above the second substrate 20d and above the first spacer G1. More specifically, the second alignment film ALM2 may be located above the second base substrate 210 and above the auxiliary light-shielding member 240 and the first spacer G1.

According to the above-described embodiments of the present invention, the thickness of the second spacer G2 may be more easily formed at a desired level. Furthermore, it is possible to prevent damage to or etching of components located below the second spacer G2, e.g., the insulating layer or the like, in the process of forming the second spacer G2. Thus, the gap between the first substrate and the second substrate may be formed and maintained at a desired level, and as a result, it is possible to provide a display device which prevents degradation of the display quality and has improved reliability.

While the embodiments of the present invention have been mainly described, they are merely examples and are not intended to limit the present inventive concept, and it will be understood by those of ordinary skill in the art that various modifications and applications which are not illustrated above can be made without departing from the essential characteristics of the embodiments of the inventive concept. For example, the respective components which are specifically illustrated in the embodiments may be practiced with modifications. Further, the differences relating to such modifications and applications should be construed as being included in the scope of the inventive concept as defined by the appended claims.

What is claimed is:

1. A display device comprising:
a first substrate that comprises a first base substrate, an insulating layer located on the first base substrate, and a barrier layer located on the insulating layer;
a second substrate that faces the first substrate;
a liquid crystal layer that is located between the first substrate and the second substrate; and
a first spacer that is located between the first substrate and the second substrate and is in contact with the first substrate,
wherein the first substrate further comprises a second spacer disposed between the first spacer and the barrier layer, the second spacer overlapping the first spacer and directly contacting the barrier layer, and
wherein the barrier layer is made of a conductive material.

2. The display device of claim 1, wherein the barrier layer comprises a material having an etch rate lower than that of the second spacer.

3. The display device of claim 1, wherein the barrier layer comprises a first portion that overlaps with the second spacer, and a second portion that does not overlap with the second spacer, and the thickness of the second portion is smaller than the thickness of the first portion.

4. The display device of claim 1, wherein the width of an end portion of the first spacer facing the first substrate is different from the width of an end portion of the second spacer facing the first spacer.

5. The display device of claim 1, wherein the thickness of the first spacer is different from the thickness of the second spacer, and
wherein the second spacer includes a metal.

6. The display device of claim 1, further comprising:
an organic layer that is located between the first spacer and the second spacer,
wherein the organic layer is in direct contact with the first spacer and the second spacer.

7. A display device comprising:
a first substrate;
a second substrate that faces the first substrate;
a liquid crystal layer that is located between the first substrate and the second substrate; and
a first spacer that is located between the first substrate and the second substrate and is in contact with the first substrate, wherein the first substrate comprises:
a first base substrate;
a thin film transistor located on the first base substrate; an insulating layer disposed on the thin film transistor;
a first electrode located on the insulating layer;
a second spacer that is located on the first electrode and overlaps with the first spacer;
a passivation layer disposed between the first spacer and the second spacer; and a second electrode located on the passivation layer and connected to the thin film transistor through a contact hole formed in the passivation layer.

8. The display device of claim 7, wherein the second spacer comprises a material having an etch rate greater than that of the first electrode.

9. The display device of claim 7, wherein the second spacer comprises an organic insulating material.

10. The display device of claim 7, wherein the second spacer comprises a metal and is in contact with the first electrode.

11. The display device of claim 7, wherein the second spacer overlaps with the thin film transistor, and
wherein the second spacer directly contacts the first electrode.

12. The display device of claim 7, wherein the second substrate further comprises:
a second base substrate,
a light-shielding member that is located on one side of the second base substrate facing the first substrate and overlaps with the thin film transistor, and
a color filter that is located on one side of the second base substrate and overlaps with the second electrode, and the first spacer is located between the light-shielding member and the first substrate.

13. The display device of claim 12, wherein the second substrate further comprises:
an upper barrier layer located between the light-shielding member and the first spacer, and the first spacer comprises a material having an etch rate greater than that of the upper barrier layer.

14. The display device of claim 7, wherein the insulating layer is a color filter.

15. The display device of claim 14, wherein the second substrate further comprises:
a second base substrate, and
a light-shielding member that is located on one side of the second base substrate facing the first substrate and is overlapped with the thin film transistor, and the first spacer is located between the light-shielding member and the first substrate.

16. The display device of claim 15, wherein the first spacer is made of the same material as the light-shielding member.

17. The display device of claim 15, wherein the second spacer overlaps with the light-shielding member.

18. The display device of claim 15, wherein the second substrate further comprises an upper barrier layer located between the light-shielding member and the first spacer, and the first spacer comprises a material having an etch rate greater than that of the upper barrier layer.

19. The display device of claim 14, wherein the second spacer comprises a light-shielding material.

20. The display device of claim 19, further comprising: an auxiliary light-shielding member that overlaps the contact hole.

21. The display device of claim 7, further comprising:
a first alignment film located on the passivation layer and the second electrode; and
a second alignment film located on the second substrate and the first spacer,
wherein the first alignment film and the second alignment film are in contact with each other between the first spacer and the second spacer.

22. A display device comprising: a first substrate;
a second substrate that faces the first substrate;
a liquid crystal layer that is located between the first substrate and the second substrate; and
a first spacer that is located between the first substrate and the second substrate and is in contact with the first substrate, wherein the first substrate comprises:
a first base substrate;
a thin film transistor located on the first base substrate;
an insulating layer disposed on the thin film transistor; a barrier layer located on the insulating layer;
a second spacer that is located on the barrier layer and overlapping with the first spacer;
a first electrode located on the barrier layer and the second spacer;
a passivation layer disposed between the first spacer and the second spacer; and
a second electrode that is located on the passivation layer and is connected with the thin film transistor through a contact hole formed in the passivation layer.

23. The display device of claim 22, wherein the second spacer comprises a material having an etch rate greater than that of the barrier layer.

24. The display device of claim 22, wherein the barrier layer comprises an inorganic insulating material, and the second spacer comprises an organic insulating material.

25. The display device of claim 22, wherein the second spacer comprises a metal and is in contact with the first electrode.

* * * * *